(12) United States Patent
Evans et al.

(10) Patent No.: US 8,645,068 B2
(45) Date of Patent: Feb. 4, 2014

(54) METHOD AND APPARATUS FOR DETERMINING FORMATION AND FLUID PROPERTIES

(75) Inventors: Michael Evans, Missouri City, TX (US); John Rasmus, Richmond, TX (US); Richard Radtke, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 499 days.

(21) Appl. No.: 12/921,429

(22) PCT Filed: Feb. 27, 2009

(86) PCT No.: PCT/IB2009/000427
§ 371 (c)(1),
(2), (4) Date: Dec. 6, 2010

(87) PCT Pub. No.: WO2009/112915
PCT Pub. Date: Sep. 17, 2009

(65) Prior Publication Data
US 2011/0077867 A1    Mar. 31, 2011

(30) Foreign Application Priority Data
Mar. 11, 2008   (EP) ..................................... 08102512

(51) Int. Cl.
*G06F 19/00*   (2011.01)
(52) U.S. Cl.
CPC ...................................... *G06F 19/00* (2013.01)
USPC ........................................................... 702/8

(58) Field of Classification Search
USPC ................................. 702/8–13, 182–185, 188
See application file for complete search history.

(56) References Cited

U.S. PATENT DOCUMENTS

| 4,129,777 | A | 12/1978 | Wahl et al. |
| 5,461,909 | A | 10/1995 | Arnold |
| 6,167,348 | A | 12/2000 | Cannon |
| 2003/0178560 | A1 | 9/2003 | Odom |
| 2005/0189483 | A1 | 9/2005 | Sale |
| 2006/0055403 | A1* | 3/2006 | Freedman ..................... 324/303 |

FOREIGN PATENT DOCUMENTS

EP   1953571 A1   8/2008

OTHER PUBLICATIONS

European Search Report issued in EP08102512.4 on Sep. 15, 2008, 5 pages.
International Search Report and Written Opinion issued in PCT/IB2009/000427 on Sep. 16, 2009, 10 pages.
Examination Report issued in GCC/P/2009/13014 on Dec. 24, 2012, 5 pages.

\* cited by examiner

*Primary Examiner* — Edward Raymond
(74) *Attorney, Agent, or Firm* — Stephanie Chi; Brigitte Jeffery Echols

(57) ABSTRACT

A downhole tool and method for determining a parameter of a formation as a function of radial distance from the borehole into the formation. The tool comprising a nuclear source for irradiating the formation and a plurality of sensors each independently measuring a density of the formation at a different radial depth into the formation. A processor combines the density measurements for determining the parameter of the formation as a function of radial distance.

16 Claims, 3 Drawing Sheets

METHOD AND APPARATUS FOR DETERMINING FORMATION AND FLUID PROPERTIES

FIELD OF THE DISCLOSURE

The invention relates to a downhole tool and in particular, but not exclusively to a downhole tool for performing density measurements of a formation to determine a parameter of the formation.

BACKGROUND OF THE DISCLOSURE

In the oil services industry after a particular hydrocarbon (oil or gas) reservoir has been discovered, the first stage of creating a producing well is concerned with drilling a borehole down into the earth's crust to reach the desired hydrocarbon reservoir. During this drilling phase, often various measurement tools are mounted on, or close to, the tip of the drill so as to provide petroleum engineers with the most up-to-date data of the drilling and the surrounding formation. Specifically, during the drilling stage various sensors can be used, for example, to measure the resistivity and porosity of the surrounding formation and send the results back to the surface for evaluation.

Even after the borehole has been drilled, it may be desirable to lower various measurement tools down the borehole in order to try and characterize the surrounding formation at different depths in the borehole. Such measurements are all useful in providing a more accurate characterization of the constituent elements of the surrounding formation. Specifically, one is able to obtain a more accurate estimate of the quality and quantity of hydrocarbon in the surrounding formation. The hydrocarbon fluid can either be in gas form (i.e. natural gas) or in liquid form (i.e. petroleum or petroleum with dissolved gas).

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment consists of a logging-while-drilling (LWD) module 120, a measuring-while-drilling (MWD) module 130, a rotary-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a nuclear measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

The formation surrounding a borehole typically comprises a plurality of different constituent materials including solids, such as different rocks or sands, and also the fluids whose quantity one wishes to measure. It is possible to distinguish between these constituent elements by measuring their respective densities and other properties. After or during the drilling process, fluid from the borehole may penetrate into the surrounding formation mixing with the fluid (hydrocarbon or water) and thereby distorting the measurement. The borehole fluid often has characteristics which are very different from those of the original formation fluid.

European patent application number 07290143 filed on 5 Feb. 2007 describes a nuclear downhole tool having a plurality of sensors each having multiple depths of investigation into the formation for establishing an invasion profile of fluid into the formation and correcting for a formation parameter to be measured. It is possible to correct the standard gamma-gamma density measurement using the determined invasion profile and to include the gamma-gamma apparent densities in the forward model and inversion.

It is however desirable to have a system which does not require any correction or inversion steps.

SUMMARY

According to one aspect of the disclosure a tool for determining a parameter of a formation as a function of radial distance from the borehole into the formation, is provided. The tool includes a nuclear source for irradiating the formation; a first plurality of sensors each independently measuring a gamma-gamma density of the formation at a different radial depth into the formation; a second plurality of sensors each independently measuring a neutron gamma density of the formation at a different radial depth into the formation; and a processor for combining the density measurements for determining the parameter of the formation as a function of radial distance.

According to another aspect of the disclosure a method for determining a parameter of a formation as a function of radial distance from the borehole into the formation is provided. The method includes irradiating the formation with a nuclear source; obtaining a gamma-gamma density measurement of the formation with a plurality of sensors; obtaining a neutron gamma density measurement of the formation with a plurality of sensors, wherein the gamma-gamma density and the neutron gamma density measurements are made with the same tool; and combining the density measurements for determining the parameter of the formation as a function of radial distance.

BRIEF DESCRIPTION OF THE DRAWINGS

Embodiments of the present invention will now be described by way of an example with reference to the accompanying drawings, in which.

DETAILED DESCRIPTION OF EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
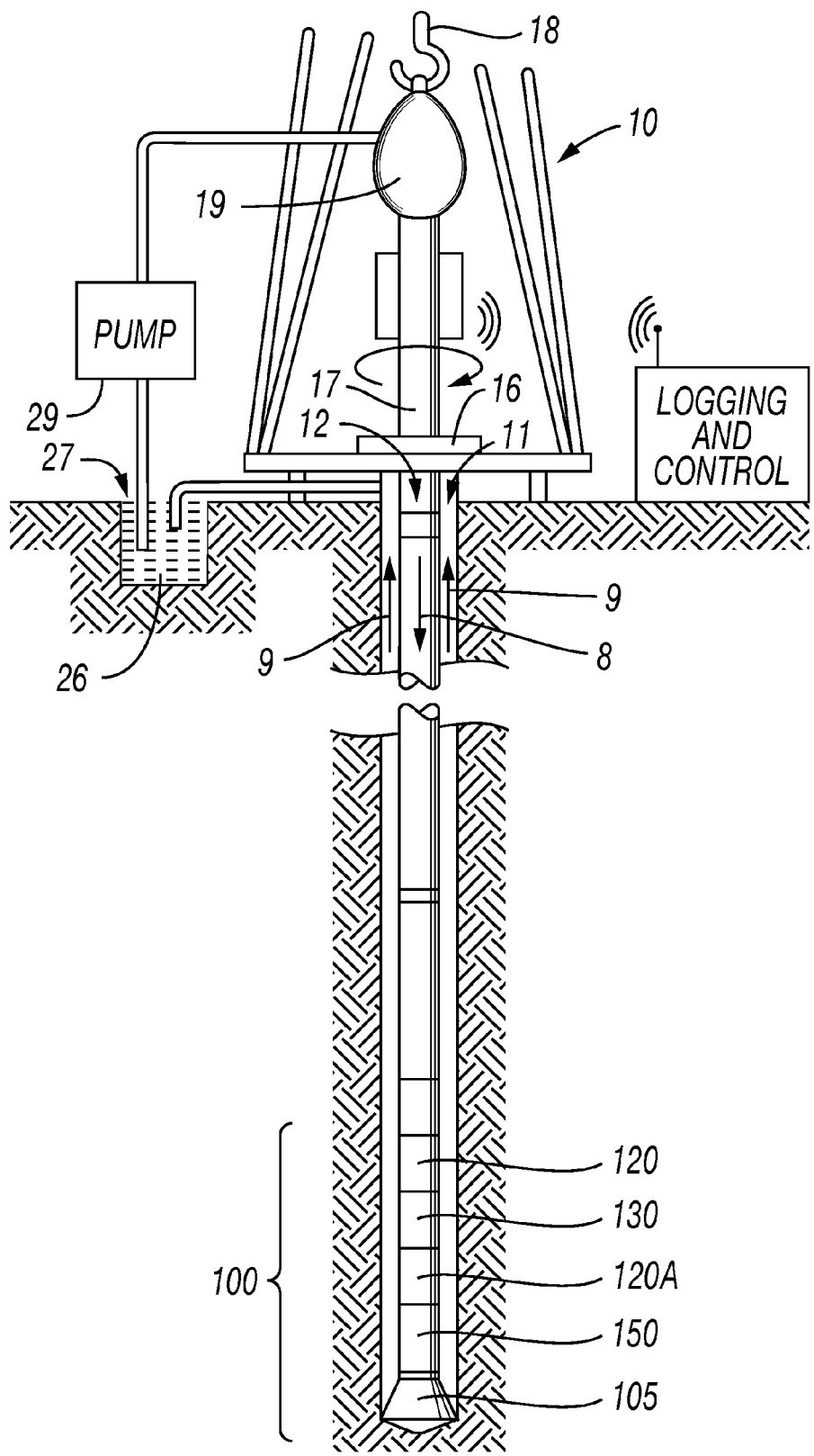
FIG. 1 shows a wellsite system in which an embodiment of the present invention can be employed.
Figure 2:
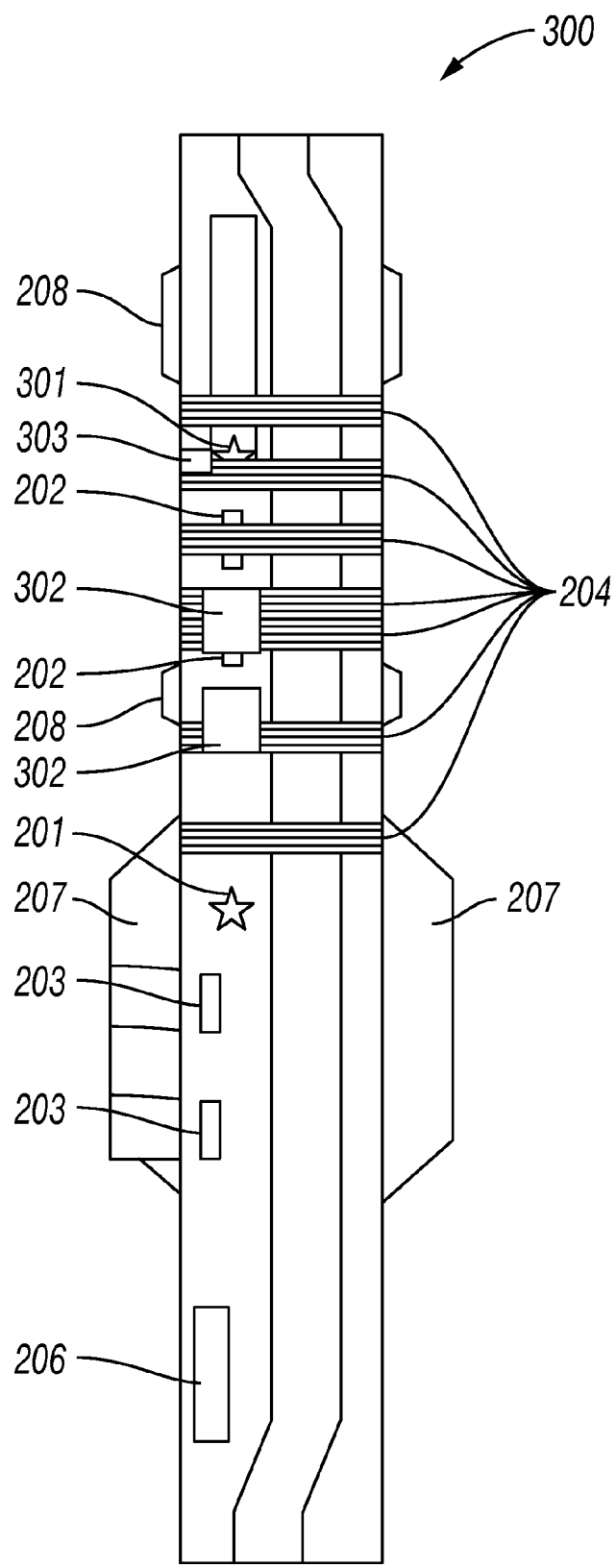
FIG. 2 shows a tool in which an embodiment of the invention can be employed.

While the tool described is an LWD tool, similar tools can be envisaged for other modes of conveyance. A more detailed example of the tool according to an embodiment of the present invention is shown in FIG. 2. To perform density measurements, the exemplary embodiment of FIG. 2 shows a chemical gamma ray source 201 for producing gamma rays that are scattered back to gamma ray detectors 203. Although two gamma ray detectors 203 are shown in FIG. 2, it should be appreciated that more of these detectors can be located on the tool.

According to an embodiment of the invention all of the density measurements can be performed by gamma ray detectors 203. However, in an alternative embodiment, additional gamma-ray detectors 302 are capable of performing additional neutron gamma density (NGD) measurements as will be described in more detail. In addition to the gamma-ray detectors 302, neutron detectors 202 are also capable of being located in the tool.

The standard gamma-gamma density measurement relies on Compton scattering of gamma-rays. Specifically, a radioactive source emits gamma rays into the formation which collide with electrons in the formation losing energy through so-called Compton scattering. The scattered gamma rays which reach a sensor on the tool are counted as an indication of formation density.

Specifically, the sensors are able to measure the formation density $\rho_b$ (or bulk density) which is the overall density of the formation including the solid matrix of the rock $\rho_{ma}$ (or matrix density) and the fluid enclosed in the pores $\rho_f$ (or fluid density). The bulk density measurement is used along with an estimate of fluid density and matrix density to determine the porosity of the formation as given by Equation 1 below:

$$\phi = \frac{\rho_b - \rho_{ma}}{\rho_f - \rho_{ma}} \qquad \text{(Eqt. 1)}$$

where
$\rho_b$=measured bulk density
$\rho_{ma}$=matrix density
$\rho_f$=fluid density However, an embodiment of the present invention addresses determining a more correct fluid density, rather than the estimated fluid density, to be used in Equation 1 above. The matrix density can be determined using spectroscopy and/or other measurements.

The traditional gamma-gamma density measurement is made using sensors spaced close to and further away from the source (also known as short and long spacing detectors), which allows for the effects of the borehole (i.e. the so-called borehole signal) to be largely eliminated. However, there remains the disadvantage that the density measurement is largely influenced by the 'standoff', i.e. the distance from the tool to the borehole wall and the limited depth of investigation into the formation of about 2 to 4 in.

An embodiment of the invention includes at least a plurality of additional sensors for performing additional NGD (neutron gamma density) measurements to overcome this disadvantage. Specifically, in one embodiment of the invention, four independent density measurements are made using the tool shown in FIG. 2. The sensitivities of each of these measurements to the borehole, formation density and invasion fluid will vary according to: the source to the sensor distance (i.e. longitudinal spacing distance from the source to each sensor), depth of penetration of the incident gamma rays and other variables. The photoelectric factor (PEF) measurement is also derived from the induced gamma rays and is a measurement capable of being used in an embodiment of the present invention.

Moreover, the additional sensors allow the further advantage of being able to take simultaneous and independent density measurements sensitive to different radial depths into the formation and from this determine the bulk density as a function of the radius into the formation. This is because the NGD measurement 302 has a significantly deeper depth of investigation and therefore complements the traditional gamma-gamma measurement 203 that is sensitive to formation properties at a shallower radial depth.

In one embodiment the parameter to be determined is the bulk density of the formation.

Figure 3:
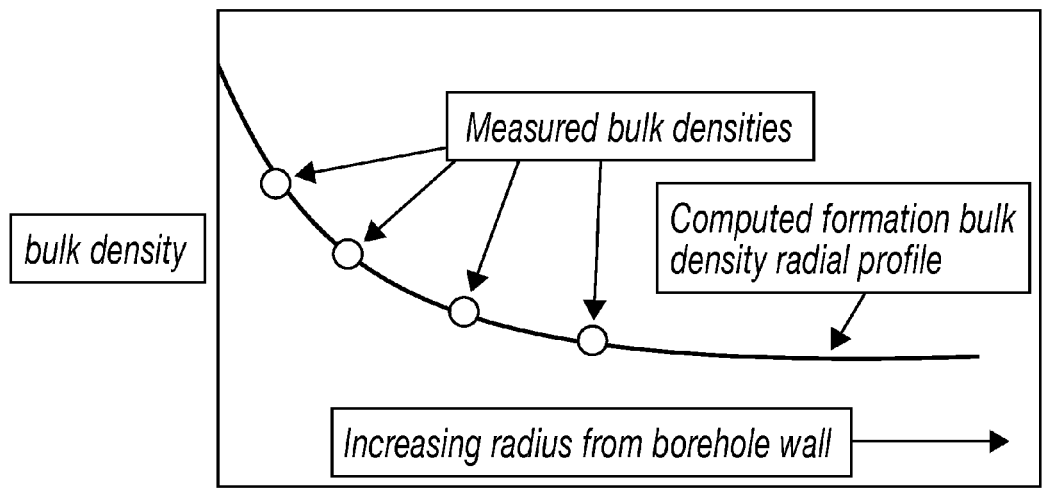
FIG. 3 shows an example of bulk density of the formation as a function of radial depth into the formation.

Specifically, the bulk density of the formation as a function of radial depth into the formation at a radial distance away from the borehole/formation interface. One example for achieving this is shown in FIG. 3, wherein the count rates measured by each detector allow the tool to make four independent density measurements. Modeling is used to determine the contribution of the formation density as a function of increasing radius on each of these measurements. The individual density measurements are convolved, for example using some particular mathematical fashion, which results in determining the formation bulk density as a function of radial depth into the formation.

Thus, from the independent density measurements, the programmable model is able to output a continuous curve that provides an estimate of bulk density as a function of the radial depth into the formation. This advantageously allows for a user of the downhole tool to be able to view a more accurate density profile of the formation, which does not suffer from the shallow standoff or environment effects of other systems.

In horizontal and high angle wells when the formation layer thickness can be less than the radial depth of investigation of the measurements, this radial profiling can be used to determine the individual layer densities with a greater accuracy than using each individual density by itself.

In a further embodiment, the tool offers even finer resolution in that the parameter to be determined is a fluid density of the formation.

This is advantageous in being able to determine a more accurate bulk density measurement by substituting a more correct value for the fluid density into Equation 1. However, a further advantage of obtaining a more accurate estimate of the fluid density is that it allows a user of the downhole tool to directly determine the type of fluid, whether it is oil, gas, water or a mixture of these. Thus, the tool is able to provide a user with a fluid density profile (fluid density as a function of radial depth into the formation), which enables the user to quickly ascertain the hydrocarbon quality of the formation and its profile.

To determine the fluid density according to one embodiment, a plurality of response equations would be set up to model the various measured densities. Specifically, equation 2 shows a response equation wherein the measured bulk density would be modeled as a response equation as a function of several properties:

$$\rho_b = f(\rho_{ma}, \rho_{mud}, \rho_{mud\,filtrate}, \rho_{formation\,fluid}, \phi_{formation}, r_i) \quad \text{Eqt. 2}$$

where
$\rho_b$ = measured density
$\rho_{ma}$ = matrix density
$\rho_{mud}$ = mud density
$\rho_{mud\,filtrate}$ = mud filtrate density
$\rho_{formation\,fluid}$ = formation fluid density
$\phi_{formation}$ = formation pore volume (porosity)
$r_i$ = mud invasion radius According to an exemplary embodiment, the matrix, mud and mud filtrate densities can be considered to be well defined and known from the spectroscopy and PEF measurements.

The relationship of fluid density to porosity, matrix density, and measured density is given by equation 2. The mud filtrate density, formation fluid density, porosity, and mud filtrate invasion radial profile can be solved as a set of simultaneous equations utilizing the four measured densities with a suitable response equation that includes the proper sensitivity coefficients for each unknown. These determinations can be made azimuthally as well as axially (radially) as a function of depth.

Likewise, the fluid hydrogen index (HI) of the formation fluid can be determined, according to one embodiment, by a plurality of response equations set up to model the various measured hydrogen indices. Specifically, equation 3 shows a response equation wherein the measured hydrogen indices would be modeled as a response equation as a function of a plurality of properties:

$$HI_b = f(HI_{ma}, HI_{mud}, HI_{mud\,filtrate}, HI_{formation\,fluid}, \phi_{formation}, r_i) \quad \text{Eqt. 3}$$

where
$HI_b$ = measured hydrogenindex
$HI_{ma}$ = matrix hydrogenindex
$HI_{mud}$ = mud hydrogenindex
$HI_{mud\,filtrate}$ = mud filtratehydrogenindex
$HI_{formation\,fluid}$ = formation fluid hydrogenindex
$\phi_{formation}$ = formation pore volume (porosity)
$r_i$ = mud invasion radius According to an exemplary embodiment, the matrix, mud and mud filtrate hydrogen indices can be considered to be well defined and known from the spectroscopy and PEF measurements.

The relationship of fluid hydrogen index to porosity, matrix hydrogen index, and measured hydrogen index is given by equation 3. The mud filtrate hydrogen index, formation fluid hydrogen index, porosity, and mud filtrate invasion radial profile can be solved as a set of simultaneous equations utilizing a plurality of measured hydrogen indices with a suitable response equation that includes the proper sensitivity coefficients for each unknown. These determinations can be made azimuthally as well as axially (radially) as a function of depth.

Alternatively, the formation porosity is considered to not vary radially, whereas the fluid density does. This reduces the number of unknowns to three and therefore only three density measurements are necessary. Advantageously, in a further embodiment it is possible to simultaneously solve for fluid density and porosity as a function of radial depth.

Figure 4:
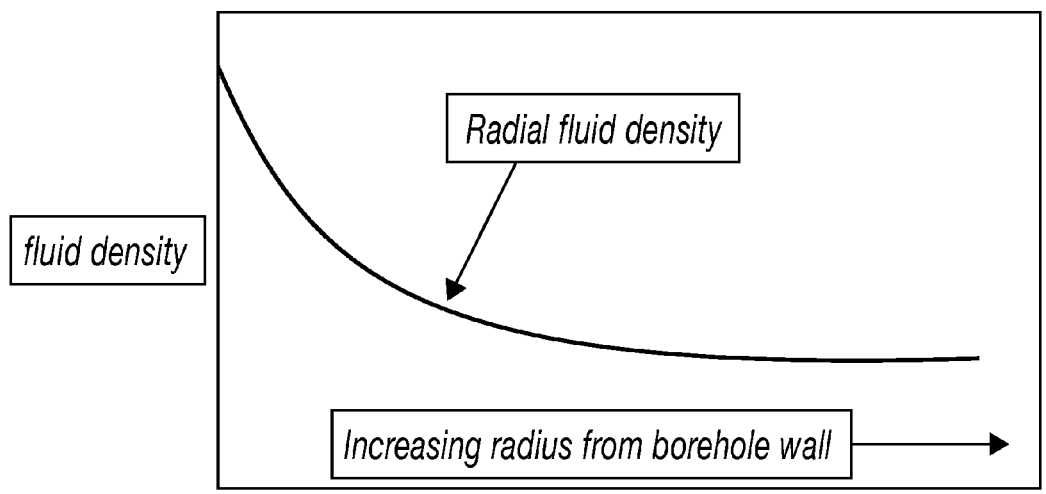
FIG. 4 shows an example of a radial fluid density profile according to an embodiment of the invention.

In any event, a preferred embodiment allows for specific parameters of the fluid in the formation to be solved for radially such as the fluid density and the porosity. Moreover, the advantage of solving these simultaneous equations is also that the invasion profile is automatically solved for as one of the unknowns, which means it is taken into account with the radial profile of a particular parameter (such as fluid density and/or porosity) without requiring separate measurements or correction steps. FIG. 4 shows an example of a radial fluid density profile according to an embodiment of the invention.

It should be appreciated that these radial depth profiles for a particular parameter of the formation, need not be perpendicular in relation to the longitudinal orientation of the tool and its sensors in the borehole. Specifically, these depth profiles that expand radially into the formation can also be made at an angle from the tool into the formation, i.e. azimuthally.

It should also be appreciated that there are a plurality of different applications for embodiments of the present invention, which include:

using a more accurate fluid density estimate in the zone of investigation of the density measurement allows a more accurate formation porosity computation to be made;

using a more accurate fluid density estimate to determine the type of fluid in the reservoir, i.e. oil, gas or water;

the depth of invasion of the mud fluids into the formation is an indication of reservoir fluid mobilities and formation permeabilities;

the radial and azimuthal profiling of fluid and bulk densities can be used to correct for the influence of varying fluid properties on other measurements such as sigma (thermal capture cross section), neutron porosity, PEF, natural gamma ray, velocity and resistivity. For example, the hydrogen index measurement could be corrected for invasion effects by using the invasion profile measured from the density measurement. This could be accomplished by substituting the invasion radius $r_i$ determined from the density response (from equation 2) into equation 3 for the hydrogen index response. This would remove the invasion radius as an unknown, resulting in improved (or corrected) estimates for the other unknowns (i.e., formation fluid hydrogen index, porosity, etc.);

the radial and azimuthal profiling of fluid and bulk density is used in conjunction with other radial measurements such as formation velocity to determine other radial varying formation properties such as elastic module, rock strength, and fluid saturation. Formation velocity is the inverse of the measured travel time per unit length of a sound wave traveling through the formation. There is a compressional and shear velocity supported by the formation.

The invention claimed is:

1. A downhole tool in a borehole for determining a parameter of a formation as a function of radial distance from the borehole into the formation, the tool comprising:
a nuclear source for irradiating the formation;
a first plurality of sensors each independently measuring a gamma-gamma density of the formation at a different radial depth into the formation;
a second plurality of sensors each independently measuring a neutron gamma density of the formation at a different radial depth into the formation; and
a processor for combining gamma-gamma density measurements and neutron gamma density measurements for determining the parameter of the formation as a function of radial distance.

2. The downhole tool of claim 1, wherein the gamma-gamma density measurements and the neutron gamma density measurements is a bulk density of the formation.

3. The downhole tool of claim 1, wherein the parameter determined is bulk density as a function of radial distance.

4. The downhole tool of claim 1, wherein the parameter determined is at least one of a fluid density and a porosity of the formation as the function of radial distance.

5. The downhole tool of claim 4, wherein at least one of the fluid density and the porosity are used to determine a bulk density of the formation.

6. The downhole tool of claim 1, wherein the processor of the downhole tool having a programmable model that is arranged to operate on the plurality of independently measured densities to determine the parameter of the formation as a function of radial distance.

7. The downhole tool of claim 1, wherein the plurality of sensors is three.

8. The downhole tool of claim 7, wherein the three sensors enable the simultaneous solution of the three unknown formation properties: porosity, fluid density and invasion radius.

9. The downhole tool of claim 1, wherein the sensors are located on the tool at different longitudinal distances from the nuclear source.

10. The downhole tool of claim 4, wherein from the determined fluid density the tool is capable of identifying whether the fluid in the formation is oil, water, gas or a particular mixture of these.

11. The downhole tool of claim 1, wherein the parameter of the formation that is determined is used to correct for the influence of varying fluid properties on at least one of the following other measurements: sigma (capture cross-section), neutron porosity, PEF, natural gamma ray, velocity and resistivity.

12. The downhole tool of claim 1, wherein the determined parameter is further determined as a function of an azimuthal angle from the borehole tool.

13. The downhole tool of claim 12, wherein a set of measurements are performed for a plurality of azimuthal angles j and such azimuthal measurements enable the determination of a formation fluid density, porosity, and invasion radius as a function of azimuthal angle j.

14. The downhole tool of claim 1, wherein the parameter determined as function of radial depth is used in combination with a second parameter determined as a function of radial depth for determining a third parameter as a function of radial depth.

15. The downhole tool of claim 12, wherein the second parameter is a formation velocity and the third parameter is at least one of an elastic module, rock strength and fluid saturation.

16. A method for determining a parameter of a formation as a function of radial distance from the borehole into the formation, the method comprising:
irradiating the formation with a nuclear source;
obtaining a gamma-gamma density measurement of the formation at a different radial depth into the formation with each of a first plurality of sensors;
obtaining a neutron gamma density measurement of the formation at a different radial depth into the formation with each of a second plurality of sensors, wherein the gamma-gamma density measurements and the neutron gamma density measurements are made with the same tool; and
combining the gamma-gamma density measurements and the neutron gamma density measurements for determining the parameter of the formation as a function of radial distance.

* * * * *